(12) United States Patent
Yamazaki

(10) Patent No.: US 8,144,352 B2
(45) Date of Patent: Mar. 27, 2012

(54) COMMUNICATION DEVICE

(75) Inventor: Masataka Yamazaki, Mie (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 759 days.

(21) Appl. No.: 12/076,477

(22) Filed: Mar. 19, 2008

(65) Prior Publication Data
US 2008/0231895 A1 Sep. 25, 2008

(30) Foreign Application Priority Data

Mar. 22, 2007 (JP) ................................. 2007-074743

(51) Int. Cl.
G06F 3/12 (2006.01)
(52) U.S. Cl. ......... 358/1.15; 358/1.1; 358/400; 358/402
(58) Field of Classification Search .................. 358/1.15, 358/1.1, 400, 402
See application file for complete search history.

(56) References Cited

U.S. PATENT DOCUMENTS

| 6,057,940 | A | 5/2000 | Kawamoto |
| 7,069,503 | B2 | 6/2006 | Tanimoto |
| 2003/0005045 | A1 | 1/2003 | Tanimoto |
| 2003/0187965 | A1* | 10/2003 | Enomoto et al. ............... 709/221 |
| 2004/0184075 | A1 | 9/2004 | Hayashi et al. |
| 2005/0219639 | A1* | 10/2005 | Fujise et al. ................... 358/402 |
| 2006/0203274 | A1* | 9/2006 | Hirose ........................... 358/1.13 |
| 2006/0221377 | A1 | 10/2006 | Nishio |
| 2006/0262356 | A1 | 11/2006 | Honda et al. |
| 2006/0268364 | A1* | 11/2006 | Oliszewski et al. ........... 358/468 |
| 2007/0115978 | A1 | 5/2007 | Kondo |

FOREIGN PATENT DOCUMENTS

| JP | 56-047163 | 4/1981 |
| JP | 04-369965 | 12/1992 |

(Continued)

OTHER PUBLICATIONS

Kikawa,Facsimile Equipment,Aug. 8, 1988,JP 63191471 A.*

(Continued)

Primary Examiner — Benny Tieu
Assistant Examiner — Martin Mushambo
(74) Attorney, Agent, or Firm — Banner & Witcoff, Ltd.

(57) ABSTRACT

There is provided a communication device comprising: a conversion unit configured to convert first data to second data having a predetermined format; a communication interface configured to interface the communication device with a network; a transmission unit configured to transmit the second data to an external device through the communication interface; a judgment unit configured to judge whether trouble would arise with respect to transmission of the second data to be executed by the transmission unit; and a storage control unit configured to store the second data while associating identification information of the external device with the second data in response to a fact that the judgment unit judges that the trouble would arise with respect to the transmission of the second data.

21 Claims, 7 Drawing Sheets

FOREIGN PATENT DOCUMENTS

| | | |
|---|---|---|
| JP | 10-271300 | 10/1998 |
| JP | 11-275293 | 10/1999 |
| JP | 2002-094758 A | 3/2002 |
| JP | 2002-368937 A | 12/2002 |
| JP | 2003-179735 | 6/2003 |
| JP | 2004-356849 A | 12/2004 |
| JP | 2006-067045 A | 3/2006 |
| JP | 2006-287291 A | 10/2006 |
| JP | 2006-287805 A | 10/2006 |

OTHER PUBLICATIONS

European Search Report issued in European Patent Application No. EP 08005194.9-1522, dated Jun. 23, 2008.

JP Office Action dtd Apr. 19, 2011, JP Appln. 2007-074743, English translation.

Office Action for European counterpart application 08005194.9 dated Oct. 21, 2011.

* cited by examiner

COMMUNICATION DEVICE

CROSS-REFERENCE TO RELATED APPLICATION

This application claims priority under 35 U.S.C. §119 from Japanese Patent Application No. 2007-074743, filed on Mar. 22, 2007. The entire subject matter of the application is incorporated herein by reference.

BACKGROUND

1. Technical Field

Aspects of the present invention relate to a communication device having a function of managing image data to be transmitted to a destination device.

2. Related Art

Conventionally, facsimile devices having a function of transmitting received facsimile data to a facsimile server have been used. An example of such a facsimile device is disclosed in Japanese Patent Provisional Publication No. HEI 11-275293.

Such a facsimile device is configured such that if the facsimile device is in a state of not being able to properly communicate with a facsimile server, the facsimile device operates in a server non-connection mode where the facsimile device prints the received facsimile data or stores the received facsimile data in the facsimile device (i.e., the facsimile device executes a facsimile receiving process in the server non-connection mode).

SUMMARY

However, the above mentioned conventional facsimile device has a drawback that the facsimile device is not able to distinguish facsimile data which is originally stored in the facsimile device and which the facsimile device is not required to transmit to the facsimile server from facsimile data which the facsimile device was not able to transmit to the facsimile server due to communication trouble. The facsimile device may be configured to distinguish facsimile data which is to be transmitted to the facsimile server from facsimile data which the facsimile server is not required to transmit to the facsimile server. Because of the above mentioned drawback, the facsimile device is not able to properly distinguish the facsimile data which is to be transmitted to the facsimile server from the facsimile data which the facsimile device is not required to transmit to the facsimile server. Such a situation may occur if the facsimile data which is to be transmitted to the facsimile server is not successfully transmitted to the facsimile server due to communication trouble and therefore remains in the facsimile device.

Aspects of the present invention are advantageous in that a communication device capable of properly distinguish image data which is stored in the communication device due to communication trouble from other types of image data stored in the communication device is provided.

According to an aspect of the invention, there is provided a communication device comprising: a conversion unit configured to convert first data to second data having a predetermined format; a communication interface configured to interface the communication device with a network; a transmission unit configured to transmit the second data to an external device through the communication interface; a judgment unit configured to judge whether trouble would arise with respect to transmission of the second data to be executed by the transmission unit; and a storage control unit configured to store the second data while associating identification information of the external device with the second data in response to a fact that the judgment unit judges that the trouble would arise with respect to the transmission of the second data.

Such a configuration makes it possible to distinguish the second data, which is stored in the communication device due to the trouble in transmission of the second data, from other data files stored in the communication device and to properly identify a destination of the second data in accordance with the associated identification information. Therefore, it is possible to properly handle the second data after the trouble arises. For example, when the trouble is recovered or by transmitting the second data to the external device via another communication route, the second data can be properly transmitted.

According to another aspect of the invention, there is provided a method to be implemented on a communication device. The method comprises the steps of: converting first data to second data having a predetermined format; judging whether trouble would arise with respect to transmission of the second data; storing the second data while associating identification information of the external device with the second data if it is judged that the trouble would arise with respect to the transmission of the second data; and transmitting the second data to an external device if it is judged that the trouble would not arise with respect to the transmission of the second data.

Such a configuration makes it possible to distinguish the second data, which is stored in the communication device due to the trouble in transmission of the second data, from other data files stored in the communication device and to properly identify a destination of the second data in accordance with the associated identification information. Therefore, it is possible to properly handle the second data after the trouble arises. For example, when the trouble is recovered or by transmitting the second data to the external device via another communication route, the second data can be properly transmitted.

According to another aspect of the invention, there is provided a computer readable medium having computer readable instruction stored thereon, which, when executed by a processor of a communication device, configures the processor to perform the steps of: converting first data to second data having a predetermined format; judging whether trouble would arise with respect to transmission of the second data; storing the second data while associating identification information of the external device with the second data if it is judged that the trouble would arise with respect to the transmission of the second data; and transmitting the second data to an external device if it is judged that the trouble would not arise with respect to the transmission of the second data.

Such a configuration makes it possible to distinguish the second data, which is stored in the communication device due to the trouble in transmission of the second data, from other data files stored in the communication device and to properly identify a destination of the second data in accordance with the associated identification information. Therefore, it is possible to properly handle the second data after the trouble arises. For example, when the trouble is recovered or by transmitting the second data to the external device via another communication route, the second data can be properly transmitted.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

DETAILED DESCRIPTION

Hereafter, an embodiment according to the invention will be described with reference to the accompanying drawings.

Figure 1:
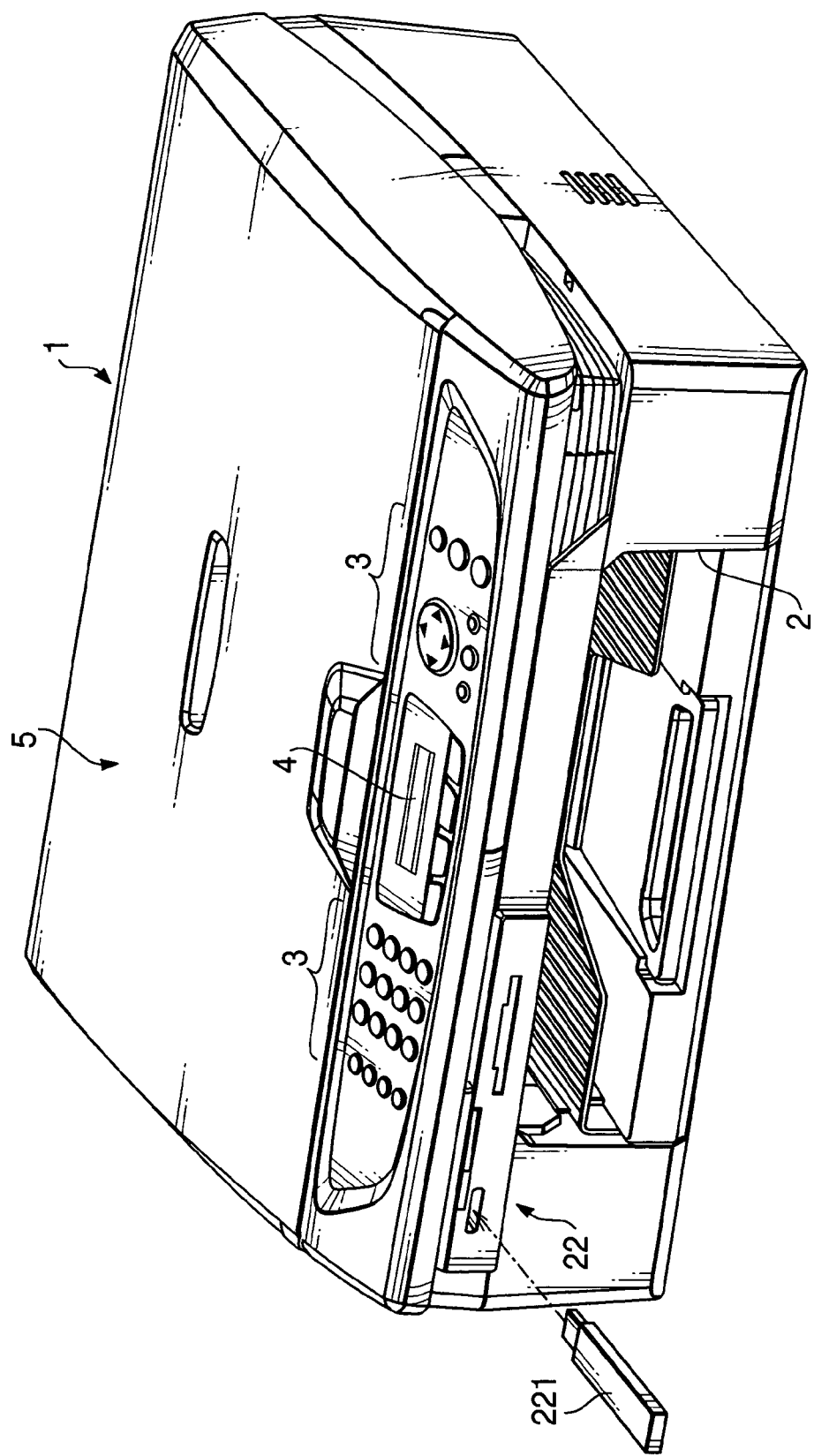
FIG. 1 is a perspective view illustrating an outer appearance of an MFP which is an example of a communication device according to an embodiment.

FIG. 1 is a perspective view illustrating an outer appearance of an MFP (Multifunction Peripheral) 1 which is an example of a communication device according to an embodiment. The MFP 1 has a facsimile function, a print function, a scanner function and a copying function. The MFP 1 is connected to a server 30 via a LAN 200 (see FIG. 2).

On the front of the MFP 1, an opening 2 is formed to divide the internal space of the MFP 1 into an upper side part and a lower side part. On the upper side in the opening 2, a scanner 16 (see FIG. 2) serving to read an original for the scanner function, the copying function and the facsimile transmission operation is provided.

The MFP 1 has an original cover 5 which is openable and closable with respect to a main body of the MFP 1. On the front side of the original cover 5, keys 3 and an LCD 4 are provided. The keys 3 are used to input numerical data, text data and commands to the MFP 1. On the LCD 4, various types of information including a menu, operation procedures and a status can be displayed. On the front surface of the MFP 1, a slot 22 is formed at a position under the keys 3. To the slot 22, a portable storage medium 221 is detachable attachable.

The MFP 1 is configured to be able to output received facsimile data in two ways. The first output operation is to print the received facsimile data on a recording sheet, and the second output operation is to convert the received facsimile data into a PDF file and to transmit the converted PDF file to the server 30. The second output operation enables the server 30 to treat facsimile data as a PDF file. Therefore, it becomes possible to easily brows, store and manage the facsimile data on the server 30.

Figure 2:
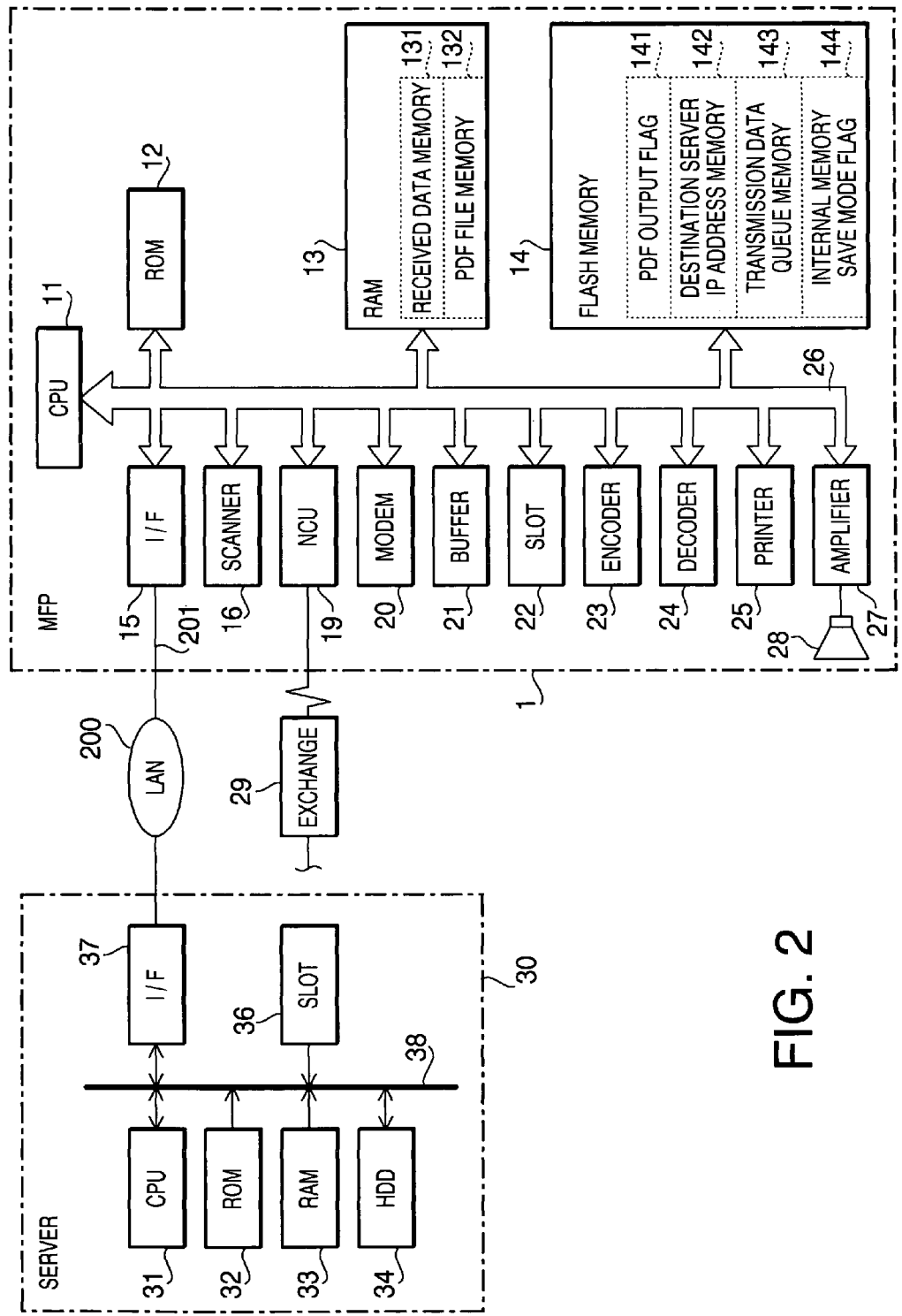
FIG. 2 illustrates a system including the MFP and a server, and block diagrams of the server and the MFP which are communicatably connected to each other via a LAN.

FIG. 2 illustrates a system including the MFP 1 and the server 30. FIG. 2 also illustrates block diagrams of the server 30 and the MFP 1 which are communicatably connected to each other via the LAN 200 in the system. The MFP 1 is connected to the LAN 200 via a LAN cable 201. As shown in FIG. 2, the MFP 1 has a CPU 11, a ROM 12, a RAM 13, a flash memory 14, a network interface (I/F) 15, the scanner 16, a NCU (Network Control Unit) 19, a modem 20, a buffer 21, the slot 22, an encoder 23, a decoder 24, a print unit 25, and an amplifier 27. These internal components are connected to each other via a bus 26. A speaker 28 is connected to the amplifier 27.

The CPU 11 performs the facsimile function by controlling the internal components in accordance with various types of signals transmitted or received via the NCU 19. In the ROM 12, various programs including a control program for controlling the facsimile function are stored. Programs for execution of processes shown in FIGS. 3 to 6 which will be described later are also stored in the ROM 12.

The RAM 13 is a work memory for the CPU 11 used to temporality store various types of data for execution of processes. More specifically, the RAM 13 includes a received data memory 131 and a PDF file memory 132. The received data memory 131 stores facsimile data which the MFP 1 receives from an external device. As described above, in the MFP 1, the received facsimile data stored in the received data memory 131 is printed on a recording sheet by the print unit 25 or is converted to a PDF file and thereafter is outputted. The PDF file memory 132 stores the PDF file formed by converting the received facsimile data.

The flash memory 14 is a nonvolatile memory. The flash memory 14 includes a PDF output flag 141, a destination server IP address memory 142, a transmission data queue memory 143, and an internal memory save mode flag 144.

The PDF output flag 141 indicates which of the first output operation and the second output operation the MFP 1 uses to treat received facsimile data. The PDF output flag 141 may be set to ON or OFF in accordance with a user operation. In the case where the PDF output flag 141 is ON, the MFP 1 operates to convert the received facsimile data into a PDF file and to transmit the PDF file to the server 30. On the other hand, in the case where the PDF output flag is OFF, the MFP 1 operates to print the received facsimile data on a recording sheet through the print unit 25.

The destination server IP address memory 142 stores an IP (Internet Protocol) address of a destination server (i.e., the server 30 in this embodiment) to which the PDF file is to be transmitted. Although in FIG. 2 only one server 30 is connected to the MFP 1 and therefore only the IP address of the server 30 is stored in the destination server IP address memory 142, more than one server (having the same function as that of the server 30) may be connected to the MFP 1. In this case, IP addresses of the servers connected to the MFP 1 may be stored in the destination server IP address memory 142.

The MFP 1 has a function of judging whether trouble arises in regard to transmission of a PDF file to the server 30. Factors of trouble in transmission of a PDF file include the fact that the server 30 is in a power off state, a break in the LAN cable 201 and the fact that the LAN cable 201 is disconnected from a connector of the MFP 1 or network equipment. If such trouble in transmission of a PDF file arises, the MFP 1 is not able to properly transmit facsimile data to the server 30. As described in detail below, if the MFP 1 judges that trouble arises in transmission of a PDF file to the server 30, the MFP 1 suspends transmission of the facsimile data to the server 30 and stores the facsimile data in the transmission data queue memory 143 or in the portable storage medium 221.

The internal memory save mode flag 144 indicates which of the transmission data queue memory 143 and the portable storage medium 221 is used preferentially to store the facsimile data as queue data. The internal memory save mode flag 144 may be set to ON or OFF in accordance with a user operation. In the case where the internal memory save mode flag 144 is ON, the MFP 1 uses preferentially the portable storage medium 221 to store the facsimile data. Such a configuration prevents the flash memory 14 from being eaten up by continuation of the state of the trouble in transmission for a relatively long time. On the other hand, in the case whether the internal memory save mode flag 144 is OFF, the MFP 1 uses preferentially the transmission data queue memory 143.

The network interface 15 interfaces the MFP 1 with the LAN 200 and the server 30 so that data communication between the MFP 1 and the server 30 can be achieved. The scanner 16 obtains image data from an original placed on an original base (not shown) of the MFP 1.

The modem 20 has a function of transmitting and receiving data by modulating and demodulating the data, and transmitting and receiving various communication protocol signals. The buffer 21 temporarily stores various data including facsimile data to be transmitted to or received from a destination facsimile device.

To the slot 22, various portable storage mediums, such as, a memory card and the portable storage medium 221, are detachably connectable. The MFP 1 has a function of writing data in and reading data from the portable storage medium 221 attached to the slot 22. The encoder 23 has a function of encoding data into facsimile data. The decoder 24 reads received data stored in the buffer 21 and decodes the received data. The facsimile data decoded by the decoder 24 is stored in the received data memory 131.

The print unit 25 is, for example, an inkjet printer, which forms an image corresponding to facsimile data. More specifically, the print unit 25 includes a sheet carrying motor, a carriage motor and a print head (not shown). The carriage motor is a stepping motor which drives a carriage, on which the print head is mounted, to produce a reciprocation motion of the carriage in a direction perpendicular to a sheet carrying direction under control of the CPU 11. The print head is an inkjet head which includes a plurality of nozzles and an actuator. In the print head, the actuator drives the nozzles to eject ink form the nozzles under control of the CPU 11. It is understood that various types of printing devices, such as, a laser printer or a thermal printer may be employed as the printer 25. The amplifier 27 amplifies a sound signal to output sound from the speaker 28.

The MFP 1 is connected to a telephone network via the NCU 19. The telephone network is connected to an exchange 29 operating for the MFP 1, and the exchange 29 is connected, via the telephone network, to an exchange operating for a destination device of the party on the other end of line.

The server 30 includes a CPU 31, a ROM 32, a RAM 33, an HDD (Hard Disk Drive) 34, a slot 36 and a network interface 37. These internal components are connected to each other via a bus 38. The CPU 31 controls these internal components in accordance with fixed values and programs stored in the ROM 32 or various commands transmitted and received via the network interface 37 to achieve functions that the server 30 has.

In the ROM 32, various programs to be executed on the server 30 are stored. The RAM 33 stores temporarily various types of data for the CPU 31. In the HDD 34, various types of data including application software are stored.

To the slot 36, various types of portable storage mediums, such as, the portable storage medium 221, are detachably connectable. The server 30 is able to write data to or read data from the portable storage medium 221 attached to the slot 36. The network interface 36 interfaces the server 30 with the LAN 200 so that the server 30 is communicatably connected to the MFP 1.

Figure 3:
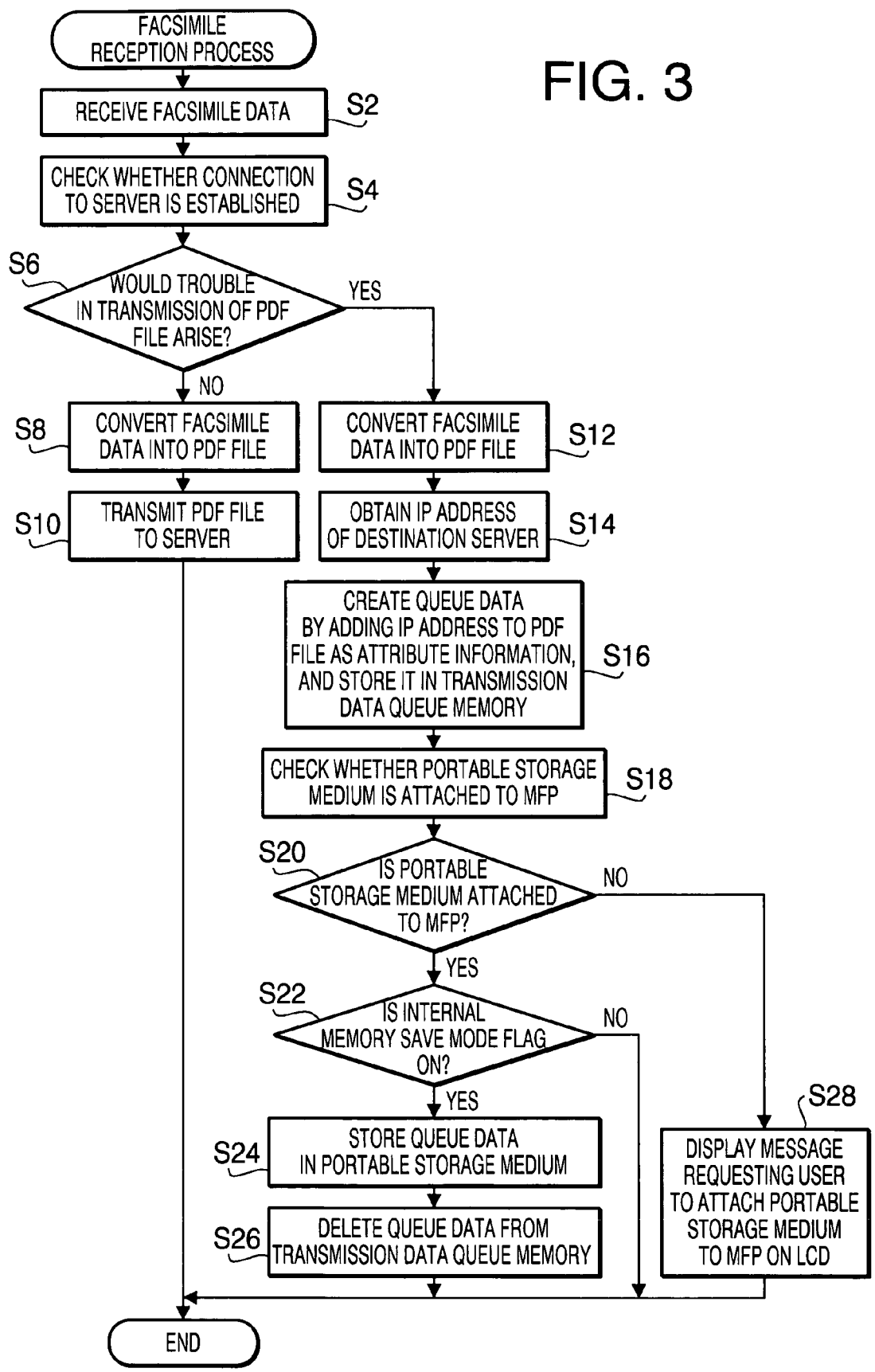
FIG. 3 is a flowchart illustrating a facsimile reception process executed by the MFP.

Hereafter, operations executed on the MFP 1 are described. FIG. 3 is a flowchart illustrating a facsimile reception process executed under control of the CPU 11 of the MFP 1. The facsimile reception process is executed on the MFP 1 when the MFP 1 receives facsimile data and the PDF output flag 141 is ON. When the facsimile reception process is started, the CPU 11 stores the received facsimile data in the received data memory 131 (step S2). Next, the CPU 11 checks whether a connection with the server 30 can be established by transmitting a command to the server 30 which is identified by an IP address stored in the destination server IP address memory 142 (step S4).

Based on a check result in step S4, the CPU 11 judges whether trouble would arise for transmission of a PDF file (step S6). If the CPU 11 judges that trouble would not arise for transmission of a PDF file (S6: NO), control proceeds to step S8 where the CPU 11 converts the received facsimile data into a PDF file. Then, the CPU 11 transmits the converted PDF file to the server 30 which is specified by an IP address stored in the destination server IP address memory 142 (step S10). Then, the facsimile reception process terminates.

If the CPU 11 judges that trouble would arise for transmission of a PDF file (S6: YES), the CPU 11 converts the received facsimile data into a PDF file and stores the PDF file in the PDF file memory 132 (step S12). Then, the CPU 11 obtains an IP address of the server 30 to which the PDF file is to be transmitted, from the destination server IP address memory 142 (step S14). Then, the CPU 11 creates queue data by associating the obtained IP address to the PDF file in a form of attribute information, and stores the queue data in the transmission data queue memory 143 (step S16). In the following, a PDF file to which an IP address is added in a form of attribute information is referred to as queue data. The attribute information includes a title, a theme, creator, a category, a keyword, comments, a source, and a version of image data, which are added to the image data in accordance with a standard of the image data. That is, the attribute information is distinguished from body data of the image data. The image data to which attribute information can be added is, for example, a PDF file, a JPEG file, a PS file and a tiff file. In an example, substantial image data is contained in a body part of an image data file, and the attribute information is contained in a header part of the image data file.

Next, in step S18, the CPU 11 checks whether the portable storage medium 221 is attached to the MFP 1 (step S18) and makes a judgment (step S20). If the portable storage medium 221 is not attached to the MFP 1 (S20: NO), the CPU 11 displays a message requesting a user to attach the portable storage medium 221 to the MFP 1 on the LCD 4 (step S28). Then, the facsimile reception process terminates. In this case, the PDF file which the MFP 1 was not able to transmit to the server 30 is stored in the transmission data queue memory 143 as the queue data to which the IP address of the server 30 is added.

If the CPU 11 judges that the portable storage medium 221 is attached to the MFP 1 (S20: YES), control proceeds to step S22 where the CPU 11 judges whether the internal memory save mode flag 144 is ON. If the internal memory save mode flag 144 is ON (i.e., if the user sets a mode where the transmission data queue memory 143 is used preferentially with respect to the portable storage medium 221) (S22: NO), the facsimile reception process terminates. In this case, the PDF file which the MFP 1 was not able to transmit to the server 30 is stored in the transmission data queue memory 143 as the queue data to which the IP address of the server 30 is added.

If the CPU 11 judges that the portable storage medium 221 is attached to the MFP 1 (S20: YES) and the internal memory save flag 144 is ON (i.e., if the user has set in advance a mode where the portable storage medium 221 is used preferentially for storing the queue data) (S22: YES), the CPU 11 stores, in the portable storage medium 221, the queue data which is now stored in the transmission data queue memory 143 (step S24). Then, the CPU 11 deletes the queue data from the transmission data queue memory 143 (step S26). Then, the facsimile reception process terminates. In this case, the PDF file which the MFP 1 was not able to transmit to the server 30 is stored in the portable storage medium 221 as the queue data to which the IP address of the server 30 is added.

The queue data which the MFP 1 was not able to transmit due to communication trouble and which is stored by the MFP 1 is associated with the IP address of the server 30. Therefore, it is possible to distinguish the queue data from other data files stored in the MFP 1 and to properly identify a destination of the queue data in accordance with the added IP address.

Since the IP address of the server 30 is added to the PDF file as the attribute information of the PDF file, a body part of the PDF file containing a substantial image of the PDF file is not modified. Such a configuration makes it possible to prevent an IP address from being printed on a recording sheet when the PDF file is printed and to prevent an IP address from being displayed on a monitor when an icon of the PDF file is selected for display.

Since the queue data which was copied to the portable storage medium 221 is deleted from the transmission data queue memory 143, it is possible to prevent the flash memory 14 from becoming full of queue data. Since particular queue data is stored only one of the portable storage medium 221 and the transmission data queue memory 143, security concerning management of queue data can also be secured.

Figure 4:
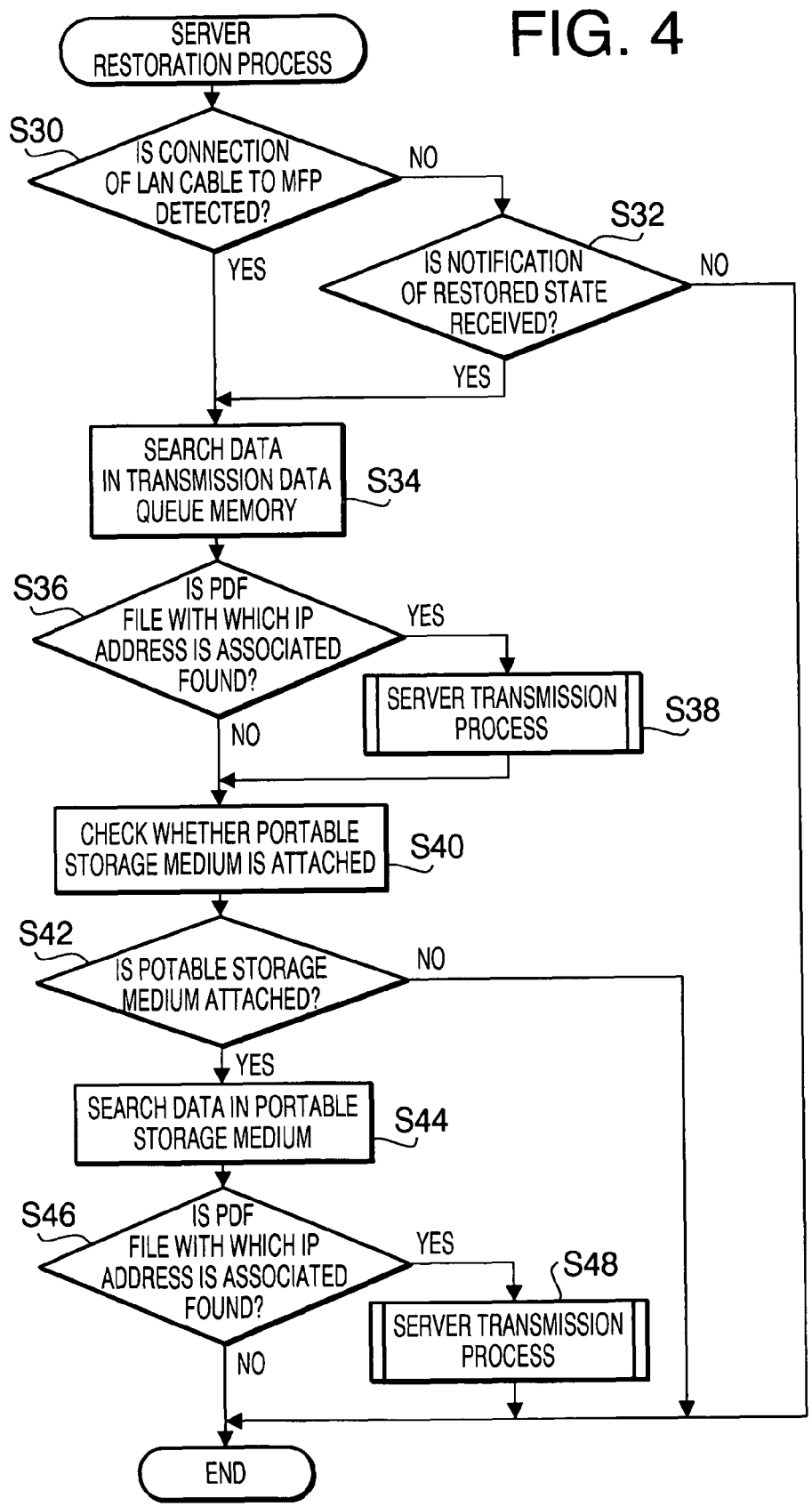
FIG. 4 is a flowchart illustrating a server restoration process executed by the MFP.

Hereafter, a server restoration process is described with reference to FIG. 4. The server restoration process is executed under control of the CPU 11 of the MFP 1. The server restoration process is a process for transmitting the queue data to the server 30 in response to the fact that the CPU 11 judges transmission of a PDF file to the server 30 to be possible. The server restoration process may be executed periodically on the MFP 1 at predetermined intervals. The CPU 11 may judge that transmission of a PDF file to the server 30 is possible based on the fact that connection of the LAN cable 201 to the MFP 1 is detected or the fact that the MFP 1 receives a notification notifying a restored state from the server 30.

When the server restoration process is started, the CPU 11 judges whether connection of the LAN cable 201 to the network interface 15 is detected (step S30). If connection of the LAN cable 201 to the network interface 15 is not detected (S30: NO), control proceeds to step S32 where the CPU 11 receives a notification notifying a restored state from the server 30 which is identified by the IP address stored in the destination server IP address memory 142. The notification of the restored state is issued by the server 30 when the server 30 is turned to ON and thereby the server 30 moves to an accessible state via the LAN 200.

If connection of the LAN cable 201 to the MFP 1 is not detected (S30: NO) and the notification of the restored state is not received (S32: NO), the CPU 11 judges that trouble of communication with the server 30 is not resolved. In this case, the server restoration process terminates.

If the connection of the LAN cable 201 to the MFP 1 detected (S30: YES) or the notification of the restored state is received from the server 30 (S32: YES), the CPU 11 judges that transmission of a PDF file to the server 30 is possible and searches data in the transmission data queue memory 143 (step S34). Next, the CPU 11 judges whether a PDF file with which an IP address is associated as attribute information is found in the transmission data queue memory 143 (step S36). If a PDF file with which an IP address is associated as attribute information is found (S36: YES), the CPU 11 executes a server transmission process which is described in detail later with reference to FIG. 5 (step S38). If no PDF file with which an IP address is associated as attribute information is found (S36: NO), control proceeds to step S40 without processing step S38. In the server transmission process, the queue data is transmitted to the server 30.

Next, the CPU 11 checks whether the portable storage medium 221 is attached to the slot 22 (step S40), and makes a judgment (step S42). If the portable storage medium 221 is not attached to the slot 22 (S42: NO), the server restoration process terminates. If the portable storage medium 221 is attached to the slot 22 (S42: YES), the CPU 11 searches data in the portable storage medium 221 for a PDF file with which an IP address is associated in a form of attribute information (step S44), and makes a judgment (step S46). If a PDF file with which an IP address is associated in a form of attribute information is found (S46: YES), the CPU 11 executes the server transmission process in which queue data is transmitted to the server 30 (step S48). The server transmission process is described later with reference to FIG. 5.

If a PDF file with which an IP address is associated in a form of attribute information is not found (S46: NO), the server restoration process terminates.

According to the above mentioned server restoration process, even if trouble arises with respect to transmission of a PDF file from the MFP 1 to the server 30 due to trouble of the LAN cable 201 or the fact that the server 30 is in the power off state, the MFP 1 is able to transmit a PDF file stored in the transmission data queue memory 143 or in the portable storage medium 221 immediately after the trouble of transmission of a PDF file is resolved.

Figure 5:
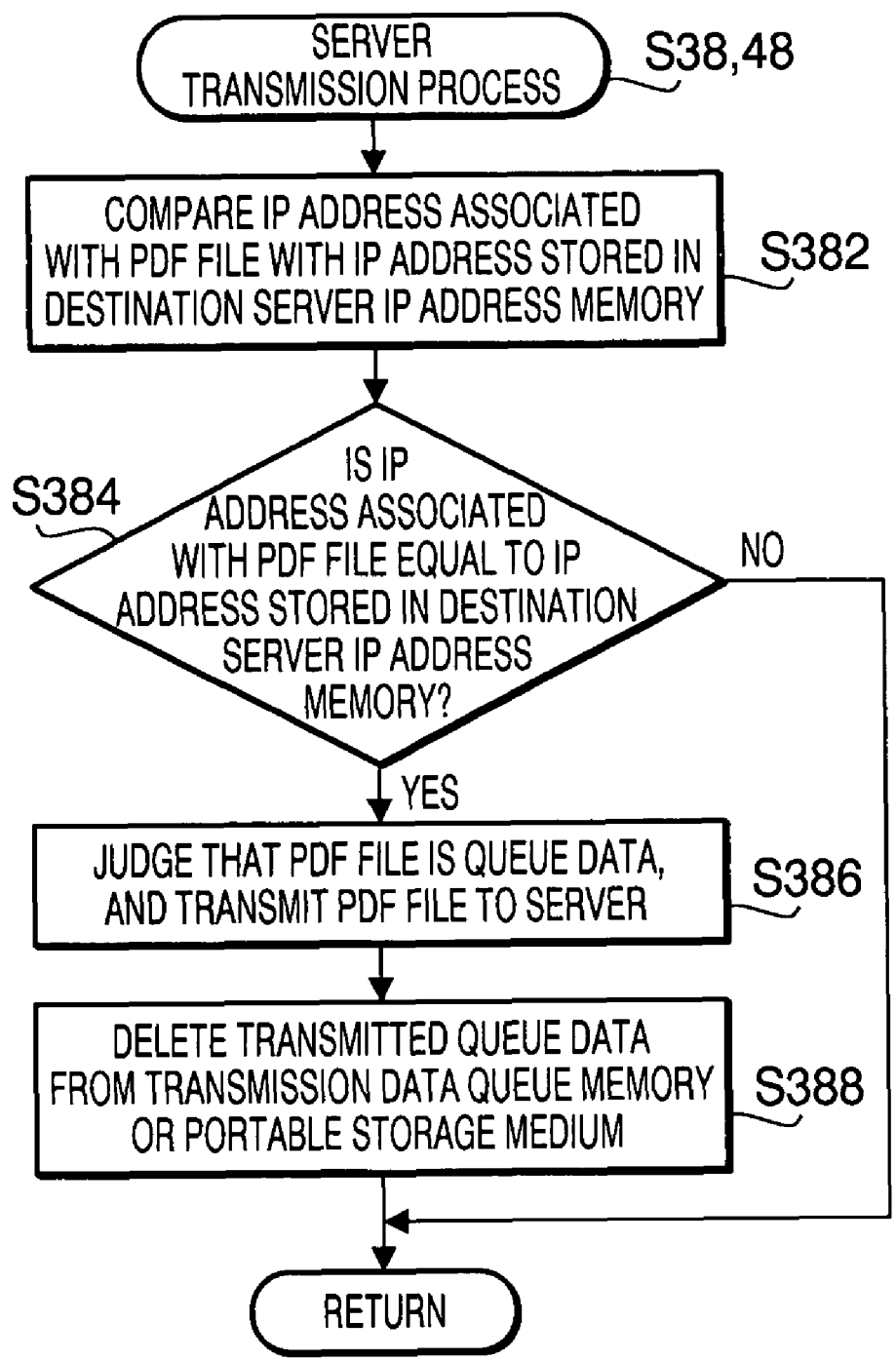
FIG. 5 is a flowchart illustrating a server transmission process executed by the MFP.

Hereafter, the server transmission process (S38, S48) executed on the MFP 1 is described with reference to FIG. 5. In the server transmission process, queue data is transmitted to the server 30 in response to a fact that the MFP 1 judges that transmission of a PDF file to the server 30 is possible.

First, the CPU 11 of the MFP 1 compares an IP address associated with the PDF file with an IP address stored in the destination server IP address memory 142 (step S382), and makes a judgment (step S384). If the IP address associated with the PDF file is equal to the IP address stored in the destination server IP address memory 142 (S384: YES), the CPU 11 judges that the PDF file is the queue data and transmits the PDF file to the server 30 (step S386).

Then, the CPU 11 deletes the transmitted queue data from the transmission data queue memory 143 or the portable storage medium 221 (step S388). Then, the server transmission process terminates. By thus deleting the queue data immediately after transmitting the queue data to the server 30, it becomes possible to secure space in the transmission data queue memory 143 or the portable storage medium 221 and thereby to effectively use the transmission data queue memory 143 and the portable storage medium 221.

If the IP address associated with the PDF file is not equal to the IP address stored in the destination server IP address memory 142 (S384: NO), the server transmission process terminates without processing steps S386 and S388.

According to the server transmission process, the PDF file is transmitted to the server 30 in response to the fact that the IP address associated with the PDF file is equal to the IP address stored in the destination server IP address memory 142. Therefore, it is possible to discriminate between the queue data to be transmitted to the server and other data. That is, in the MFP 1, the queue data is transmitted to the server 30, while data other than the queue data is preserved in the MFP 1. For example, even if a PDF file to which an IP address which is different from the IP address stored in the destination server IP address memory 142 is stored in the transmission data queue memory 143 or the portable storage medium 221, or even if setting of a server is modified, the MFP 1 is able to prevent such a PDF file from being transmitted to the server 30.

Figure 6:
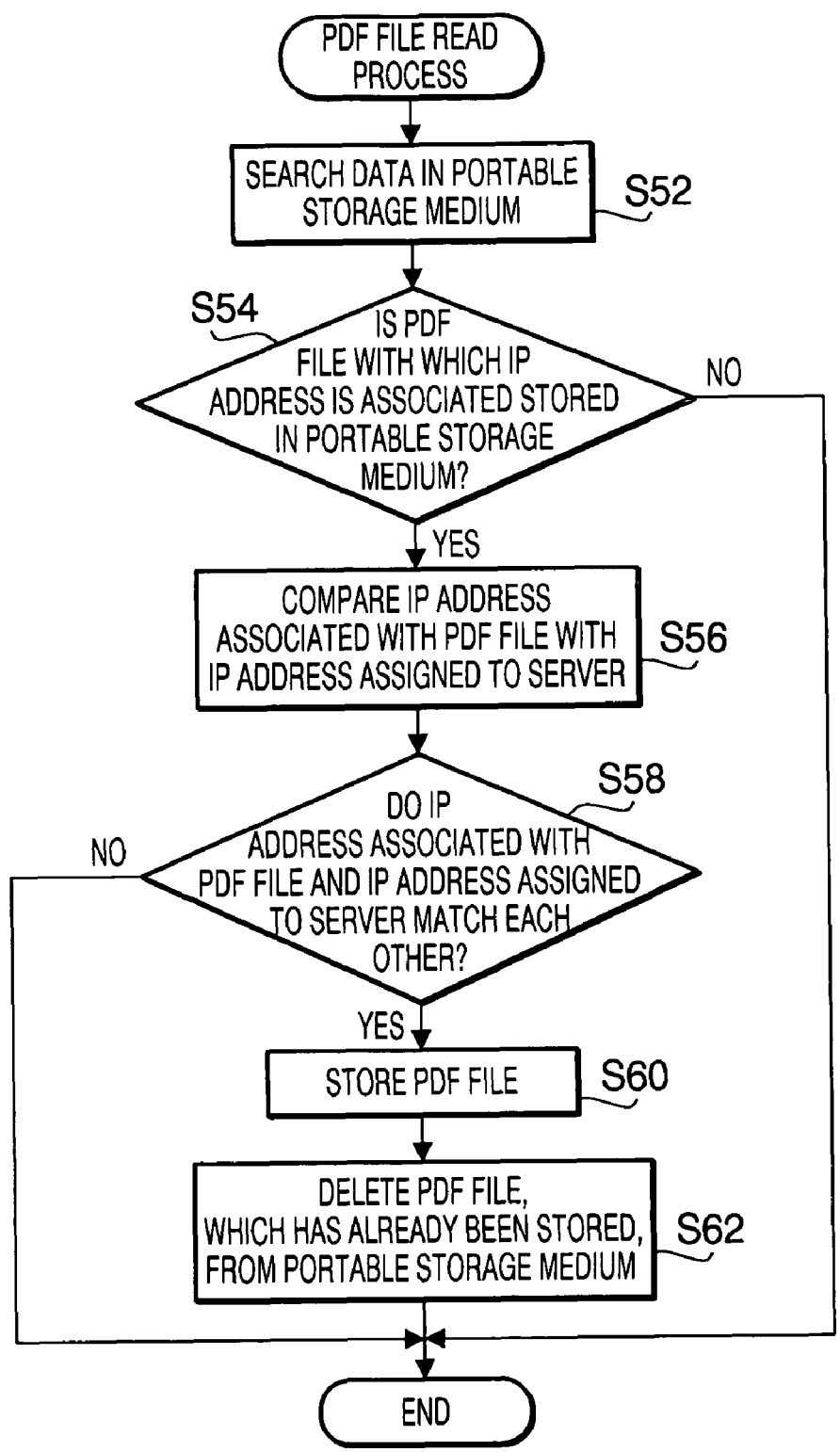
FIG. 6 is a flowchart illustrating a PDF file read process executed by the server.

Hereafter, a PDF file read process executed on the server 30 is described with reference to FIG. 6. The PDF file read process is executed when the portable storage medium 221 is attached to the slot 36.

First, the CPU 31 of the server 30 searches data in the portable storage medium 221 (step S52). Then, the CPU 31 judges whether a PDF file with which an IP address is associated in a form of attribute information is stored in the portable storage medium 221 (step S54). If the CPU 31 judges that a PDF file with which an IP address is associated in a form of attribute information is not stored in the portable storage medium 221 (S54: NO), the PDF file read process terminates.

On the other hand, if the CPU 31 judges that a PDF file with which an IP address is associated in a form of attribute information is stored in the portable storage medium 221 (S54: YES), the CPU 31 compares the IP address associated with the PDF file with the IP address assigned to the server 30 (step S56). Then, the CPU 31 judges whether the IP address associated with the PDF file and the IP address assigned to the server 30 match each other (step S58).

If the IP address associated with the PDF file and the IP address assigned to the server 30 do not match (S58: NO), the CPU 31 judges that the PDF file stored in the portable storage medium 221 is not the queue data addressed to the server 30 and terminates the PDF file read process without reading data from the portable storage medium 221.

If the IP address associated with the PDF file and the IP address assigned to the server 30 match each other (S58: YES), the CPU 31 judges that the PDF file stored in the portable storage medium 221 is the queue data addressed to the server 30. In this case, the CPU 31 reads the PDF file (i.e., the queue data) from the portable storage medium 221, and stores the PDF file in the HDD 34 (step S60).

Then, the CPU 31 deletes the PDF file, which the CPU 31 has already read, from the portable storage medium 221 (step S62). Then, the PDF file read process terminates.

According to the PDF file read process, it is possible to cause the server 30 to extract the queue data addressed to the server 30 by simply detaching the portable storage medium 221 from the MFP 1 and then attaching the portable storage medium 221 to the slot 36 of the server 30. It is understood that such a configuration is very convenient in the situation where the communication between the MFP 1 and the server 30 is in trouble and particularly in the situation where such an abnormal state of the communication between the MFP 1 and the server 30 continues for a relatively long time.

Although the present invention has been described in considerable detail with reference to certain preferred embodiments thereof, other embodiments are possible.

For example, the above mentioned functions that the MFP 1 has may be implemented in various types of devices having a facsimile function.

In the above mentioned server restoration process (FIG. 4), the queue data is searched for when connection of the LAN cable 201 to the network interface 15 is detected (S30: YES) or when the notification notifying the restored state of the server is received (S32: YES). However, the MFP 1 may periodically search for the queue data. In this case, the MFP 1 may transmit the queue data to the server when the queue data is found, and may delete the queue data from the transmission data queue memory 143 or the portable storage medium 221 when transmission of the queue data to the server is successfully finished.

In the above mentioned embodiment, the destination of the received facsimile data is the server 30. However, the MFP 1 may be configured to transmit the received facsimile data to a device, such as a printer, different from the server 30.

Figure 7:
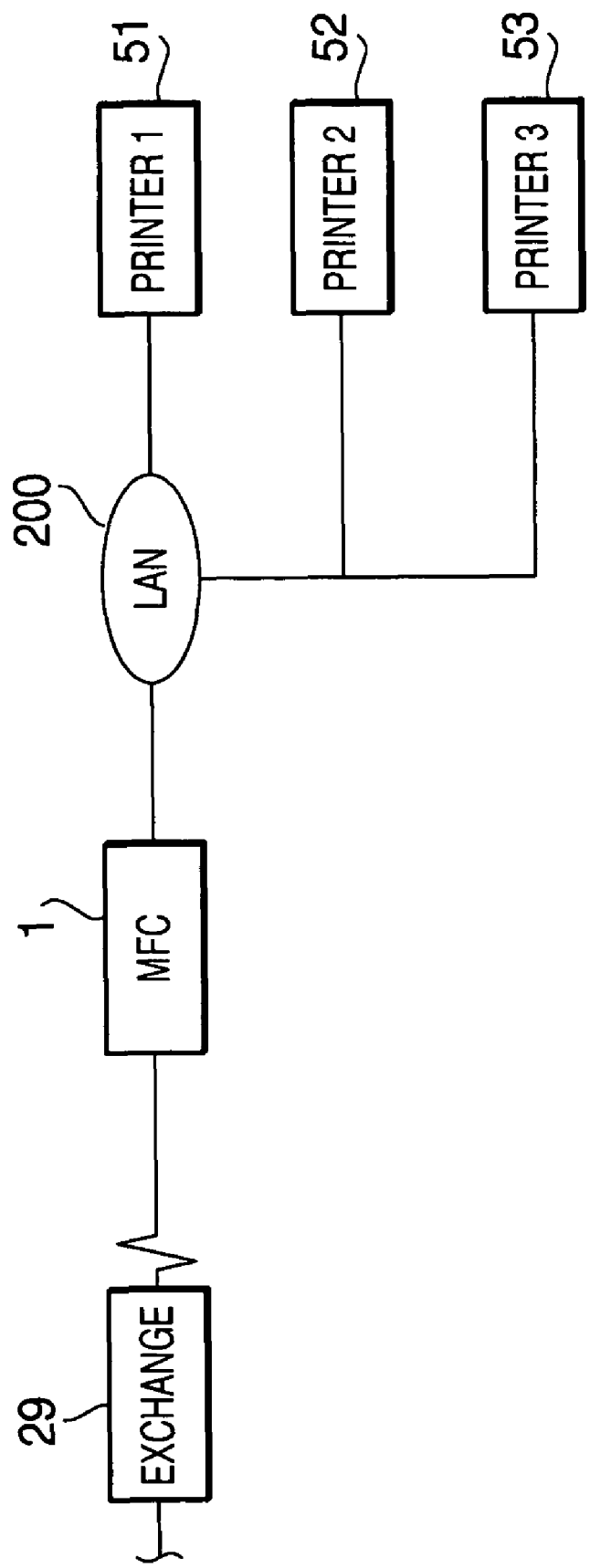
FIG. 7 illustrates a system configuration formed as a variation of the system shown in FIG. 2.

FIG. 7 illustrates a system configuration formed as a variation of the above mentioned embodiment. In the system of FIG. 7, the MFP 1 is connected to printers 51, 52 and 53 via the LAN 200. In this system, the MFP 1 analyzes the received facsimile data to determine which of the printers 51-53 the MFP 1 should transmit the received data to based on the result of the analysis. Such a configuration enables the MFP 1 to print the received facsimile data on one of the printers nearest to a recipient of the received facsimile data.

More specifically, in the system shown in FIG. 7, the MFP 1 is configured to store IP addresses of the printers 51-53. The MFP 1 analyzes the facsimile data received through the exchange 29, and transmits the received facsimile data to the printer selected in accordance with the result of the analysis. In this case, the MFP 1 converts the received facsimile data into print data which a printer is able to handle, and then transmits the converted print data to the selected printer. Further, if the MFP 1 judges that trouble would arise in transmission of the print data to the selected printer, the MFP 1 associates an IP address of a destination printer with the print data, and then stores the print data in the MFP 1 or in the portable storage medium 221 attached to the MFP 1. Such a configuration enables the MFP 1 to transmit the print data to a target printer for printing when the communication with the target printer is restored.

In the above mentioned, the facsimile data is converted into a PDF file. However, a file format to which the facsimile data is converted is not limited to a PDF file format.

In the above mentioned embodiment, an IP address is associated with a PDF file in a form of attribute information. However, an IP address may be associated with image data by adding the IP address to a filename of the image data. Such a configuration makes it possible to visibly recognize the IP address associated with the image data. In this case, if print setting is configured not to print a filename of image data, the filename is prevented from being printed together with the image data.

In the above mentioned embodiment, an IP address is associated with a PDF file. However, information for identifying a destination device is not limited to an IP address. For example, a MAC address of a destination device may be used in place of an IP address.

In the above mentioned embodiment, the MFP 1 and the server 30 are connected to each other via the LAN 200. However, the MFP 1 and the server 30 may be connected to each other via various types of networks (e.g., the Internet).

The process of step S16 in the facsimile reception process (FIG. 3) may be configured to add information indicating prohibition of user access to the crated queue data as access limit information so that the queue data is treated as a read only file or a non-readable file. In this case, the process of step S386 of the server transmission process (FIG. 5) may be configured such that the access limit information added to the queue data is changed to information indicating permission of user access or the server may be configured to release the access limit of the received queue data. Consequently, it becomes possible to maintain the security of the queue data until the queue data is transmitted successfully to the server 30. For example, even if a portable storage medium in which the queue data is stored is removed from the MFP 1 and is attached to another device, the security of the queue data can be maintained.

What is claimed is:

1. A communication device, comprising:
   a communication interface configured to interface the communication device with a network;
   a transmission unit configured to transmit second data having a predetermined format to an external device through the communication interface;
   a processing unit;
   an identification storage unit configured to store identification information of the external device; and
   one or more non-transitory computer readable media configured to store executable instructions, which when executed by the processing unit, cause the communication device to provide:
      a conversion unit configured to convert first data to the second data having the predetermined format to allow attribute information to be added to the second data;
      a judgment unit configured to judge whether the transmission unit would be able to transmit the second data to the external device through the communication interface;
      a storage control unit configured to store the second data while associating identification information of the external device with the second data by adding the identification information of the external device to the second data in a form of the attribute information in response to the judgment unit judging that the transmission unit is not able to transmit the second data to the external device;
      a queue data judgment unit configured to judge whether the second data with which the identification information is associated is stored in a memory; and
      a comparing unit configured to compare the identification information associated with the second data with the identification information stored in the identification storage unit in response to a fact that the second data with which the identification information is associated is stored in the memory,
   wherein the transmission unit is configured to transmit the second data to the external device in response to a fact that the comparing unit judges that the identification information associated with the second data is equal to the identification information stored in the identification storage unit.

2. The communication device according to claim 1, wherein:
   the second data includes a header part and a body part;
   the first data is contained in the body part of the second data; and
   the attribute information is contained in the header part of the second data.

3. The communication device according to claim 1, wherein the storage control unit is further configured to associate the identification information with the second data by adding the identification information of the external device to a filename of the second data.

4. The communication device according to claim 1, further comprising:
   a data memory in which the second data is stored;
   an attachment unit to which a portable storage medium is detachably attachable, and
   wherein the instructions, when executed by the processing unit, cause the communication device to further provide:
      a portable medium control unit configured to store the second data in the portable storage medium attached to the attachment unit; and
      a deletion unit configured to delete the second data, which the portable medium control unit has stored in the portable storage medium, from the data memory.

5. The communication device according to claim 4,
   wherein the second data is stored in the data memory,
   wherein the comparing unit is configured to compare the identification information associated with the second data with the identification information stored in the identification storage unit in response to the second data with which the identification information is associated being stored in the data memory.

6. The communication device according to claim 5, wherein the instructions, when executed by the processing unit, cause the communication device to further provide:
   a communication judgment unit configured to judge whether communication with the external device is possible,
   wherein the queue data judgment unit is configured to judge whether the second data with which the identification information is associated is stored in response to the communication judgment unit judging that the communication with the external device is possible.

7. The communication device according to claim 4,
   wherein the second data is stored in the portable storage medium,
   wherein the comparing unit is configured to compare the identification information associated with the second data with the identification information stored in the identification storage unit in response to the second data with which the identification information is associated being stored in the portable storage medium.

8. The communication device according to claim 7, wherein the instructions, when executed by the processing unit, cause the communication device to further provide:
   a communication judgment unit configured to judge whether communication with the external device is possible,
   wherein the queue data judgment unit is configured to judge whether the second data with which the identification information is associated is stored in response to the communication judgment unit judging that the communication with the external device is possible.

9. The communication device according to claim 4, wherein the instructions, when executed by the processing unit, cause the communication device to further provide:
   an access information control unit configured to assign information for inhibiting user access to the second data stored in one of the data memory and the portable storage medium in a form of access limit information,
   wherein the access information control unit changes the access limit information assigned to the second data to information for permitting user access when the transmission unit transmits the second data to the external device.

10. The communication device according to claim 1, further comprising a facsimile communication unit configured to transmit and receive facsimile data, wherein the first data is received by the communication device from an external facsimile device through the facsimile communication unit.

11. The communication device according to claim 1, wherein the first data is received by the communication device externally from a device.

12. The communication device according to claim 1, wherein the second data is image data.

13. A method to be implemented on a communication device, comprising the steps of:
converting first data to second data having a predetermined format to allow attribute information to be added to the second data;
judging whether the transmission unit would be able to transmit the second data;
storing the second data while associating identification information of the external device with the second data by adding the identification information of the external device to the second data in a form of the attribute information if it is judged that the second data would not be able to be transmitted;
transmitting the second data to an external device if it is judged that the second data would be able to be transmitted;
judging whether the second data with which the identification information is associated is stored in a memory; and
comparing the identification information associated with the second data with the identification information stored in an identification storage unit of the communication device if it is judged that the second data with which the identification information is associated is stored in the memory,
wherein, in the step of transmitting, the second data is transmitted to the external device if it is judged that the identification information associated with the second data corresponds to the identification information stored in the identification storage unit.

14. The method according to claim 13,
wherein the second data is stored in a data memory of the communication device; and
wherein the step of comparing compares the identification information associated with the second data with the identification information stored in an identification storage unit of the communication device if it is judged that the second data with which the identification information is associated is stored in the data memory.

15. The method according to claim 14, further comprising the step of:
judging whether communication with the external device is possible,
wherein the step of judging whether the second data with which the identification information is associated is stored is executed if it is judged that the communication with the external device is possible.

16. The method according to claim 13,
wherein the second data is stored in a portable storage medium attached to the communication device; and
wherein the step of comparing compares the identification information associated with the second data with the identification information stored in an identification storage unit of the communication device if it is judged that the second data with which the identification information is associated is stored in the portable storage medium.

17. A non-transitory computer readable medium having computer readable instructions stored thereon, which, when executed by a processor of a communication device, configure the processor to perform the steps of:
converting first data to second data having a predetermined format to allow attribute information to be added to the second data;
judging whether the transmission unit would be able to transmit the second data;
storing the second data while associating identification information of the external device with the second data by adding the identification information of the external device to the second data in a form of the attribute information if it is judged that the second data would not be able to be transmitted;
transmitting the second data to an external device if it is judged that the second data would be able to be transmitted. transmitted;
judging whether the second data with which the identification information is associated is stored in memory; and
comparing the identification information associated with the second data with the identification information stored in an identification storage unit of the communication device if it is judged that the second data with which the identification information is associated is stored in the memory,
wherein, in the step of transmitting, the second data is transmitted to the external device if it is judged that the identification information associated with the second data corresponds to the identification information stored in the identification storage unit.

18. The non-transitory computer readable medium according to claim 17,
wherein the second data is stored in a data memory of the communication device; and
wherein the step of comparing compares the identification information associated with the second data with the identification information stored in an identification storage unit of the communication device if it is judged that the second data with which the identification information is associated is stored in the data memory.

19. The non-transitory computer readable medium according to claim 18, wherein the instructions further configure the processor to perform the step of:
judging whether communication with the external device is possible,
wherein the step of judging whether the second data with which the identification information is associated is stored is executed if it is judged that the communication with the external device is possible.

20. The non-transitory computer readable medium according to claim 17,
wherein the second data is stored in a portable storage medium attached to the communication device; and
wherein the step of comparing compares the identification information associated with the second data with the identification information stored in an identification storage unit of the communication device if it is judged that the second data with which the identification information is associated is stored in the portable storage medium, medium.

21. A system comprising:
a communication device including
a communication interface configured to interface the communication device with a network;
a transmission unit configured to transmit second data having a predetermined format to an external device through the communication interface;
an attachment unit to which a portable storage medium, is detachably attachable;
a processing unit; and
one or more non-transitory computer readable media configured to store executable instructions, which when executed by the processing unit, cause the communication device to provide:

a conversion unit configured to convert first data to the second data having the predetermined format to allow attribute information to be added to the second data;

a judgment unit configured to judge whether the transmission unit would be able to transmit the second data to the external device through the communication interface;

a storage control unit configured to store the second data while associating identification information of the external device with the second data by adding the identification information of the external device to the second data in a form of the attribute information in response to the judgment unit judging that the transmission unit is not able to transmit the second data to the external device; and a portable medium control unit configured to store, in the portable storage medium attached to the attachment unit, the second data to which the identification information of the external device is added; and an external device including
an attachment unit to which a portable storage medium is detachably attachable; and
a processor configured to:
judge whether the identification information added to the second data in the portable storage medium coincides with identification information of the external device when the portable storage medium is attached to the attachment unit of the external device;
obtain the second information from the portable storage medium when the identification information added to the second data in the portable storage medium is judged to coincide with the identification information of the external device; and
delete the second data in the portable storage medium.

* * * * *

UNITED STATES PATENT AND TRADEMARK OFFICE
CERTIFICATE OF CORRECTION

| | |
|---|---|
| PATENT NO. | : 8,144,352 B2 |
| APPLICATION NO. | : 12/076477 |
| DATED | : March 27, 2012 |
| INVENTOR(S) | : Masataka Yamazaki |

It is certified that error appears in the above-identified patent and that said Letters Patent is hereby corrected as shown below:

In Column 14, Claim 17, Lines 8-9:
Please replace "transmitted. transmitted;" with --transmitted;--

In Column 14, Claim 20, Line 53:
Please replace "medium, medium." with --medium.--

Signed and Sealed this
Twenty-fourth Day of July, 2012

David J. Kappos
*Director of the United States Patent and Trademark Office*